United States Patent Office 3,767,618
Patented Oct. 23, 1973

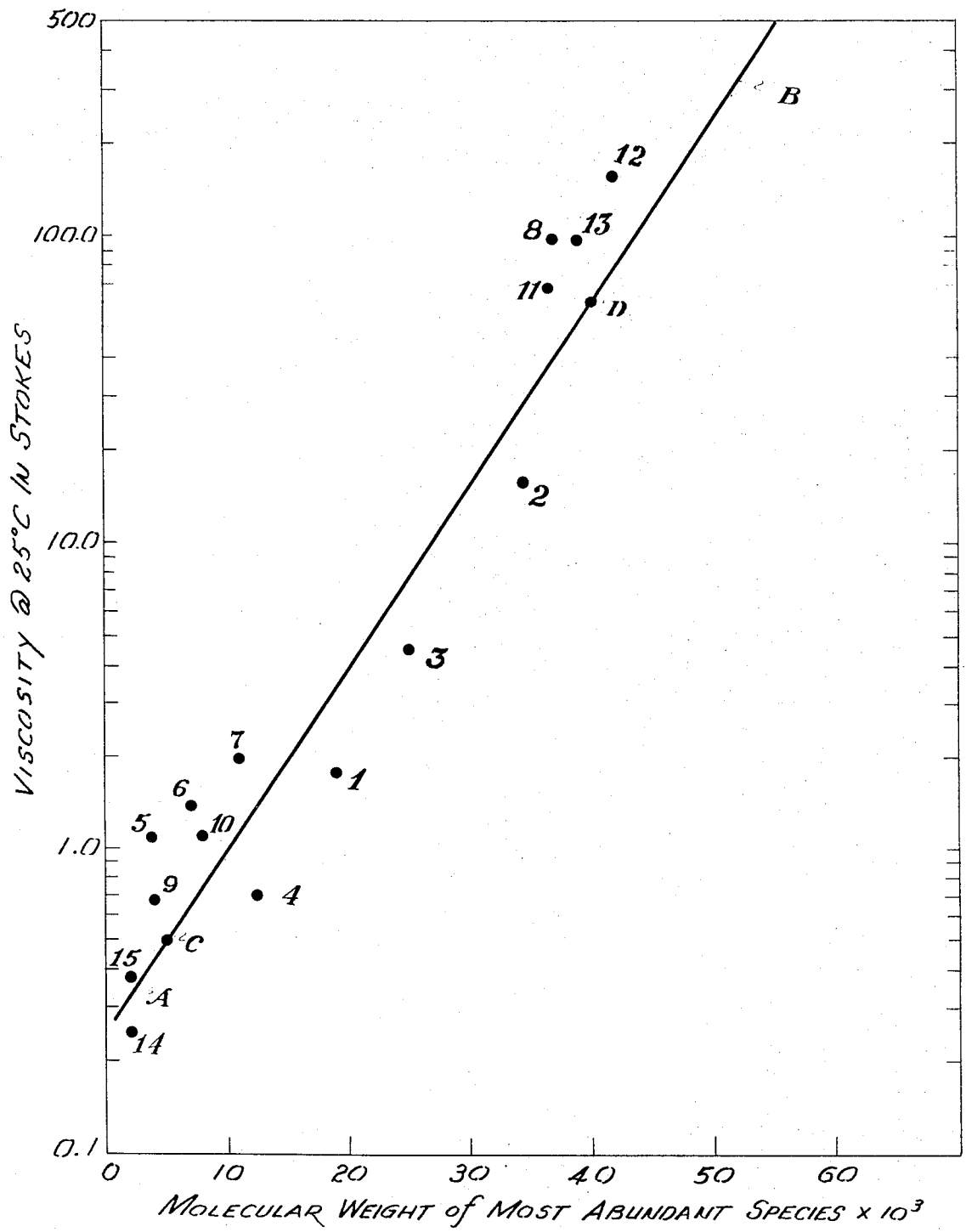

3,767,618
PROCESS FOR THE PREPARATION OF EPOXY RESINS BY INTERFACIAL CONDENSATION AND THE RESULTANT RESINS
Thomas Joseph Hairston and Wilbur Lee Bressler, Lake Jackson, Tex., assignors to The Dow Chemical Company, Midland, Mich.
Continuation-in-part of abandoned application Ser. No. 74,845, Sept. 23, 1970. This application Sept. 23, 1971, Ser. No. 183,052
Int. Cl. C08g 30/04
U.S. Cl. 260—47 EP            7 Claims

ABSTRACT OF THE DISCLOSURE

An improvement in the preparation of epoxy resins from a polyhydroxyl-containing compound, such as bisphenol A, and a halohydrin, such as epichlorohydrin, in the presence of a dehydrohalogenation agent such as sodium hydroxide by interfacial condensation is disclosed wherein the improvement is conducting the reaction in the presence of water, in the amount of 3–20 parts by weight per part of combined reactants, as the sole reaction medium other than the reactants and compounds attendant to the reaction such as the dehydrohalogenating agent and the epoxy resins produced thereby characterized as having comparatively low solutions viscosities.

---

This is a continuation-in-part of our copending application Ser. No. 74,845, filed Sept. 23, 1970, now abandoned.

This invention relates to an improved process for the preparation of epoxy resins by interfacial condensation, said improvement comprising conducting the reaction in the presence of water as the sole reaction medium other than the reactants or compounds attendant to the reaction such as dehydrohalogenation agents and effecting the reaction in the presence of agitation and to epoxy resins having low solution viscosities.

Epoxy resins have heretofore been prepared by interfacial condensation as reported in the articles, "Polycondensation at the Interface," M. S. Akutin, L. N. Smirnova, and D. Filippenko, Plasticheskie Massy 1961, No. 1, 10–11, and "Epoxide Resins Prepared by the Reaction on the Phase Interfaces," Jaroslav Kalal and Vladimir Horak (Vysoka Skola Chem. Technol., Prague), Chem. Prumysl 13(6), 325 8(1963), but these processes employed an organic compound as the reaction medium.

Fränkel, in U.S. 3,313,775, has prepared epoxy resins in the presence of minor amounts of water and long reaction times.

It has now been discovered that epoxy resins having more linear characteristics, i.e. lower solution viscosities, and being higher in molecular weight can be produced by preparing the epoxy resin by interfacial condensation employing relatively large amounts of water as the sole reaction medium.

FIG. 1 is a graph which shows the viscosity-molecular weight relationship of commercially available epoxy resins and those of the examples of the present invention. The ordinate or y axis is the solution viscosity in stokes at 25° C. of a 40% solution of the resin in methyl ethyl ketone on a logarithmic scale. The abscissa or x axis is the molecular weight of the most abundant species of the resin as determined by gel permeation chromatography and is on an arithmatic scale. The graph may be easily reconstructed on semi-logarithmic graph paper by employing the logarithmic axis for the viscosity and the arithmatic axis for the molecular weight. The line AB can be described by constructing a line through two points C and D having the coordinates (x, y) of 5000, 0.5 and 40,000, 62 respectively.

The data plotted on the graph in FIG. 1 is, for convenience, tabulated in the following table.

| Reference point number | Source of epoxy resin | Molecular wt. of the most abundant species as determined by gel permeation chromatography | Viscosity of a 40% by wt. methyl ethyl ketone at 25° C., in stokes |
|---|---|---|---|
| 1 | Example No. 1 | 19,000 | 1.8 |
| 2 | Example No. 2 | 34,500 | 17.0 |
| 3 | Example No. 3 | 25,000 | 4.5 |
| 4 | Example No. 4 | 12,300 | 0.7 |
| 5 | D.E.R.® 667 [1] | 4,000 | 1.4 |
| 6 | D.E.R.® 668 [1] | 3,900 | 1.1 |
| 7 | D.E.R.® 669 [1] | 11,000 | 2.0 |
| 8 | D.E.R.® 636 [1] | 37,000 | 100 |
| 9 | Epon® 1007 [2] | 4,050 | 0.68 |
| 10 | Epon® 1009 [2] | 8,000 | 1.1 |
| 11 | Epanol® 53 [2] | 36,500 | 68 |
| 12 | Epanol® 55 [2] | 42,000 | 160 |
| 13 | Bakelite® phenoxy resin [3] | 39,000 | 100 |
| 14 | Example 5A | 2,044 | 0.25 |
| 15 | Example 5B | 2,044 | 0.38 |

[1] Commercially available from The Dow Chemical Company.
[2] Commercially available from Shell Chemical Company.
[3] Commercially available from Union Carbide Corporation.

The novel aromatic-based epoxy resins of this invention are characterized as possessing a solution viscosity to molecular weight relationship which falls on or below the line AB in FIG. 1 wherein said solution viscosity is the viscosity in stokes at 25° C. of a 40% solution of said epoxy resin in methyl ethyl ketone and the molecular weight is the molecular weight of the most abundant species as determined by gel permeation chromatography. The lower molecular weight epoxy resins, i.e. those having a molecular weight of the most abundant species of below about 11,000, usually have more than one 1,2-epoxy group per molecule whereas the high molecular weight epoxy resins, i.e. those having a molecular weight of the most abundant species above about 15,000, may be terminated in phenolic hydroxyl groups and the average number of epoxy groups may be less than one 1,2-epoxy group per molecule and some molecules may not have any epoxy groups at all.

The epoxy resins are prepared according to the improved process of the present invention by reacting an aromatic polyhydroxyl-containing compound with a halohydrin, such as epichlorohydrin, in the presence of an alkaline acting dehydrohalogenating agent such as, for example, sodium hydroxide, sodium carbonate and the like, in an aqueous reaction medium while mixing with a high shear mixer at temperatures n the range of from about 75° to about 160° C. and preferably from about 80° to about 110° C. for from about 2 to about 10 minutes and preferably from about 4 to about 7 minutes.

The ratio of halohydrin to polyhydroxyl-containing compounds may vary depending upon the molecular weight desired in the final product; however, generally the ratio will be from about 0.95 to about 2.0 moles of epihalohydrin per mole of polyhydroxyl containing compound. The water is employed in quantities of from about 3 to about 20 parts per each part by weight of the combined weight of the reactants.

Suitable compounds which may be employed as the aromatic polyhydroxyl-containing compound to react with the epihalohydrin include, for example, the aromatic dihydroxyl-containing compounds such as hydroquinone, resorcinol, catechol, and compounds represented by the formula

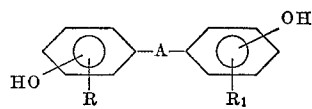

wherein A is an alkylene or alkylidine group having from about 1 to about 4 carbon atoms,

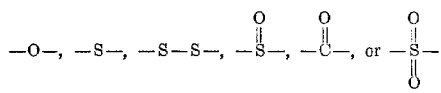

and R and $R_1$ are independently selected from hydrogen, chlorine or bromine.

Also included as suitable polyhydroxyl-containing aromatic compounds are those phenol-aldehyde or phenol-ketone condensation products represented by the formula

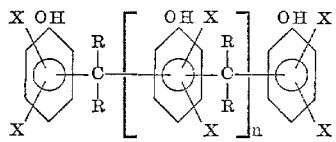

wherein each R is independently hydrogen or a lower alkyl group having from 1 to about 4 carbon atoms, each X is independently hydrogen, chlorine, bromine or a lower alkyl group having from about 1 to about 4 carbon atoms and $n$ has an average value of from about 0.01 to about 0.5, preferably from about 0.01 to about 0.3.

Suitable halohydrin compounds which may be employed to react with the aromatic polyhydroxyl-containing compound include, for example, glycerinedichlorohydrin, glycerinedibromohydrin, epichlorohydrin, epibromohydrin, epiodohydrin and the like.

The molecular weight of the products are varied by varying the ratio of the aromatic polyhydroxyl-containing compound to the halohydrin compound as is well known in the art. One of the particular advantage of the improved process of the present invention is that where the ratio of polyhydroxyl-containing compound to halohydrin compound is identical, the molecular weight of the resultant epoxy resin can be increased by increasing the speed of mixing.

The epoxy resins produced by the improved process of the present invention posses lower solution viscosity values than do epoxy resins of comparable molecular weight produced by the usual processes. This is particularly valuable in solution coating applications wherein the resins of the present invention require less solvent to prepare solution resins of suitable spray viscosities.

The following examples are illustrative of the present invention but are not to be construed as to limiting the scope thereof in any manner.

EXAMPLE 1

To a reaction vessel equipped with a variable speed stirrer, temperature control means, condenser and addition funnel was added 100 grams of p,p'-isopropylidene diphenol, 35.1 grams of sodium hydroxide and 900 grams of water. The contents were thoroughly mixed and the temperature was raised to 80–85° C. While continuously stirring at a speed of 277 r.p.m., 40.5 grams of epichlorohydrin was quickly added through the addition funnel. After 4 minutes, the product rapidly precipitated. The excess sodium hydroxide was neutralized by the addition of HCl to a phenolphthalein end point. The product was then dissolved in 300 grams of methylethyl ketone and washed twice with water to remove any sodium chloride retained by the product. The methyl ethyl ketone was then removed by placing the solution in an 80° C. oven at 30 in. Hg vacuum for 16 hours. A polymeric epoxy resin product in an amount of 120 grams was recovered which had a molecular weight of the most abundant species of 1,900, and a molecular weight range of 1,000 to 95,000 as determined by gel permeation chromatography. A 40% solution by weight of the product in methyl ethyl ketone had a viscosity at 25° C. of 1.8 stokes.

EXAMPLE 2

To a reaction vessel equipped with a variable speed stirrer, temperature control means, condenser and addition funnel was added 10.0 grams of p,p'-isopropylidene diphenol, 3.51 grams of sodium hydroxide and 90.0 grams of water. The contents were thoroughly mixed and the temperature raised to 80–85° C. While continuously stirring at a speed of 12,800 r.p.m., 4.05 grams of epichlorohydrin was quickly added through the addition funnel. After 4 minutes, the product precipitated rapidly. The excess sodium hydroxide was neutralized by the addition of HCl to a phenolphthalein end point. The product was then dissolved in 30.0 grams of methyl ethyl ketone and washed twice with water to remove any sodium chloride retained by the product. The methyl ethyl ketone was then removed by placing the solution in an 80° C. oven at 30 in. Hg vacuum for 16 hours. A polymeric epoxy resin product in an amount of 12.0 grams was recovered which had a molecular weight of the most abundant species of 34,500 and a molecular weight range of 4,500 to 350,000 as determined by gel permeation chromatography and a 40% solution in methyl ethyl ketone had a viscosity at 25° C. of 17 stokes.

EXAMPLE 3

Into a reaction vessel equipped with a variable speed stirrer, temperature control means, condenser and addition funnel was added 600 grams of p,p'-isopropylidene diphenol, 210 grams of sodium hydroxide and 5400 grams of water. The contents were thoroughly mixed and the temperature raised to 80–85° C. While continuously stirring at a speed of 10,000 r.p.m., 243.0 grams of epichlorohydrin was quickly added through the addition funnel. After 4 minutes, the product precipitated rapidly. The excess sodium hydroxide was neutralized by the addition of HCl to a phenolphthalein end point. The product was then dissolved in 2000 grams of methyl ethyl ketone and washed twice with water to remove any sodium chloride retained by the product. The methyl ethyl ketone was then removed by placing the solution in an 80° C. oven, at 30 in. Hg vacuum for 16 hours. A polymeric epoxy resin product in an amount of 690 grams was recovered which had a molecular weight of the most abundant species of 25,000 and a molecular weight range of 4000 to 400,000 as determined by gel permeation chromatography. A 40% solution by weight of the product in methyl ethyl ketone had a viscosity at 25° C. of 4.5 stokes.

EXAMPLE 4

(Comparative example demonstrating that low molecular weight products are produced when the reaction medium contains water and an organic compound)

The following example demonstrates that products lower in molecular weight are obtained when the polyhydroxyl-containing compound and the epihalohydrin are reacted in a medium containing an organic solvent in addition to water as the reaction medium. The ratio of the polyhydroxyl containing compound to the epihalohydrin was identical to that of Example 2.

Into a reaction vessel equipped with a variable speed stirrer, temperature control means, condenser and addition funnel was added 10.0 grams of p,p'-isopropylidene diphenol, 3.51 grams of sodium hydroxide, 90 grams of water and 36.5 grams of toluene. The contents were thoroughly mixed and the temperature raised to 80–85° C. While continuously stirring at a speed of 12,800 r.p.m., 4.05 grams of epichlorohydrin was quickly added through the addition funnel. After 4 minutes the product precipitated rapidly. The reaction was terminated by the addition of HCl to a phenolphthalein end point. The product was then dissolved in 300 grams of methyl-ethyl ketone and washed twice with water to remove any sodium chloride retained by the product. The methyl ethyl ketone was then removed by placing the solution in an 80° C. oven at 30 in. Hg vacuum for 16 hours. A polymeric epoxy resin product in an amount of 10.39 grams was recovered which had a molecular weight of the most abundant species of 12,300 and a molecular weight range of 1000 to 35,000 as determined by gel permeation chromatography and a viscosity, as a 40% solution by weight in methyl ethyl ketone, at 25° C. of 0.7 stokes.

EXAMPLE 5

(A) To a reaction vessel equipped with a variable speed high shear stirrer, temperature control means, condenser and addition funnel was added 10.0 grams of p,p'-isopropylidene diphenol, 3.15 grams of sodium hydroxide and 90.0 grams of water. The contents were thoroughly mixed and the temperature was raised to 90° C. While continuously stirring at a speed of 277 r.p.m., 5.26 grams of epichlorohydrin was quickly added through the addition funnel. After 10 minutes, 20 ml. of methylethyl ketone was added and the phases separated after stirring for 5 minutes. The organic layer was washed with water until neutral. The methoyl ethyl ketone was then removed by placing the solution in a 135° C. oven at 28–30 in. Hg vacuum. The polymeric epoxy resin product had a molecular weight of the most abundant species of 2044 and a molecular weight range of 260 to 17,750 as determined by gel permeation chromatography. A 40% solution by weight of the product in methyl ethyl ketone had a Gardner viscosity at 25° C. of 0.25 stoke.

(B) (Comparative) The procedure and ratio of reactants approximating but not identical to Example 1 of U.S. 3,313,775 was employed in this example for comparison with Example 5A).

To a reaction vessel equipped as in Example 1 were added 100 grams of p,p'-isopropylidene diphenol, 52.6 grams of epichlorohydrin and 189 grams of water. After heating to 56° C., 31.5 grams of sodium hydroxide and 94.5 grams of water were added and the reaction continued with stirring at 277 r.p.m. for 2 hours and 22 minutes during which time the contents exothermed to a temperature of 89° C. Methyl ethyl ketone in an amount of 200 ml. was then added and the organic layer washed with water until neutral. The methyl ethyl ketone was then removed by placing the solution in a vacuum oven at 135° C. and 28–30 in. Hg vacuum. The resultant product had a molecular weight of the most abundant species of 2044 as determined by gel permeation chromatography and 40% solution by weight of the product in methyl ethyl ketone had a viscosity at 25° C. of 0.38 stoke.

In like manner as the preceding examples, epoxy resins having characteristics similar to those obtained therein are obtained when the polyhydroxyl-containing compound is p,p'-methylenediphenol or a phenol-formaldehyde novolac resin having a phenolic hydroxyl functionality from 2.01 to 2.3.

We claim:

1. In a process for the preparation of solid epoxy resins by interfacial condensation comprising reacting an aromatic-containing polyhydroxyl-containing compound with an epihalohydrin in the presence of a dehydrohalogenating agent, the improvement comprising conducting the reaction in the presence of from about 3 to about 20 parts of water per each part by weight of the combined weights of the reactants as the sole reaction medium for from about 2 to about 10 minutes at a temperature of from about 75° to about 160° C.

2. The process of claim 1 wherein the polyhydroxyl-containing compound is selected from the group consisting of resorcinol, catechol, hydroquinone and compounds represented by the formulae

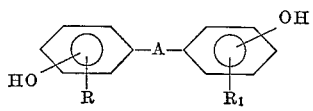

wherein A is an alkylene or alkylidene group having from about 1 to about 4 carbon atoms,

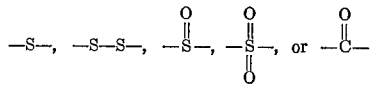

and R and R₁ are independently selected from hydrogen, chlorine and bromine.

3. The process of claim 2 wherein the polyhydroxyl containing compound is p,p'-isopropylidine diphenol.

4. The process of claim 1 wherein the dehydrohalogenating agent is sodium hydroxide.

5. The process of claim 1 wherein the epihalohydrin is epichlorohydrin.

6. The process of claim 1 wherein the polyhydroxyl-containing compound is a compound represented by the formula

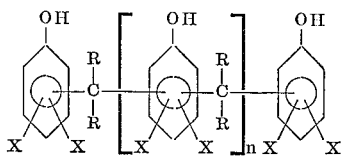

wherein each R is independently hydrogen or a lower alkyl group having from 1 to about 4 carbon atoms, each X is independently hydrogen, chlorine, bromine or a lower alkyl group having from 1 to about 4 carbon atoms and $n$ has an average value of from about 0.01 to about 0.5.

7. The process of claim 6 wherein each R and X are hydrogen and $n$ has an average value of from about 0.01 to about 0.3.

References Cited

UNITED STATES PATENTS

| | | | |
|---|---|---|---|
| 3,309,384 | 3/1967 | Shimp | 260—348.6 |
| 3,313,775 | 4/1967 | Frankel | 260—47 |

HAROLD D. ANDERSON, Primary Examiner

T. E. PERTILLA, Assistant Examiner

U.S. Cl. X.R.

260—50; 51 EP, 59, 348.6

PO-1050
(5/69)

UNITED STATES PATENT OFFICE
CERTIFICATE OF CORRECTION

Patent No. 3,767,618          Dated October 23, 1973

Inventor(s) T. J. Hairston and W. L. Bressler

It is certified that error appears in the above-identified patent and that said Letters Patent are hereby corrected as shown below:

Col. 2, line 49, change "n" to --in--.

Col. 3, line 68, change "1,900" to --19000--.

Signed and sealed this 5th day of November 1974.

(SEAL)
Attest:

McCOY M. GIBSON JR.
Attesting Officer

C. MARSHALL DANN
Commissioner of Patents